United States Patent [19]
King, Jr.

[11] 3,921,280
[45] Nov. 25, 1975

[54] METHOD OF FORMING AN INSERT IN A WORKPIECE FOR RECEIVING A THREADED FASTENER

[76] Inventor: John O. King, Jr., 3990 N. Ivy Road, Atlanta, Ga. 30342

[22] Filed: Sept. 6, 1973

[21] Appl. No.: 394,923

Related U.S. Application Data

[63] Continuation-in-part of Ser. No. 268,478, July 3, 1972, Pat. No. 3,835,615, which is a continuation-in-part of Ser. No. 33,281, April 30, 1970, abandoned, which is a continuation-in-part of Ser. No. 711,368, March 7, 1968, abandoned.

[52] U.S. Cl. .................. 29/509; 29/523; 10/152; 151/14 R
[51] Int. Cl.² ............ B21D 39/00; B23P 11/02
[58] Field of Search ........... 29/523, 509; 10/152, 86; 151/14 R, 33

[56] References Cited
UNITED STATES PATENTS

| | | |
|---|---|---|
| 843,650 | 2/1907 | Wilkinson ................. 29/523 UX |
| 3,193,857 | 7/1965 | Kahn ..................... 29/523 X |
| 3,193,858 | 7/1965 | Kahn ..................... 29/523 X |
| 3,193,921 | 7/1965 | Kahn ..................... 29/523 X |
| 3,203,451 | 8/1965 | Vincent .................. 29/523 UX |
| 3,269,006 | 8/1966 | Welles ................... 29/523 X |
| 3,412,565 | 11/1968 | Lindsey et al. ............ 29/523 X |

*Primary Examiner*—Charlie T. Moon
*Attorney, Agent, or Firm*—B. J. Powell

[57] ABSTRACT

An insert to be installed in a hole in a work piece for threadedly receiving a fastener including a thin-walled seamless tubular section with a head flange integral with one end thereof. The side wall of the tubular section has threads coined therein after placement in the hole in the work piece. The method of installing the insert is also disclosed.

2 Claims, 20 Drawing Figures

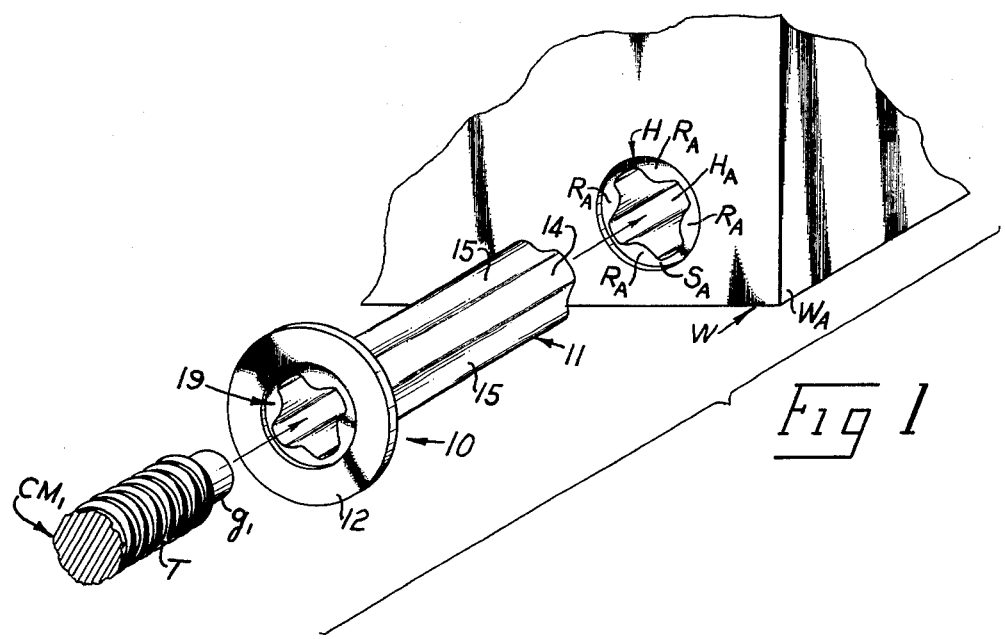
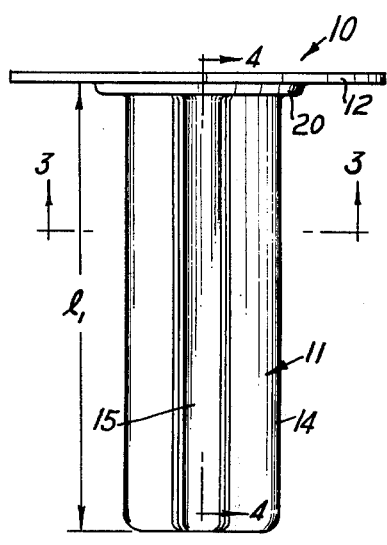
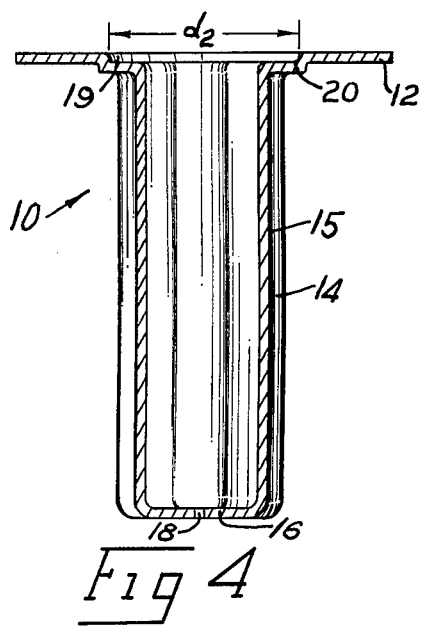
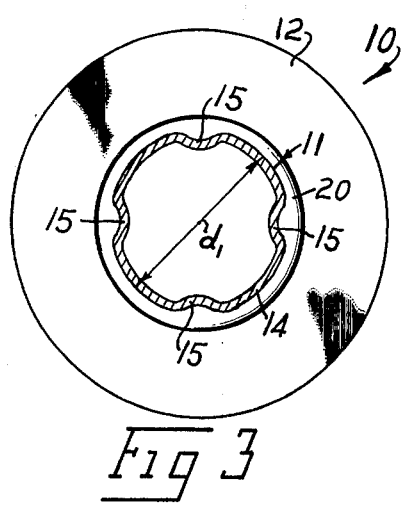
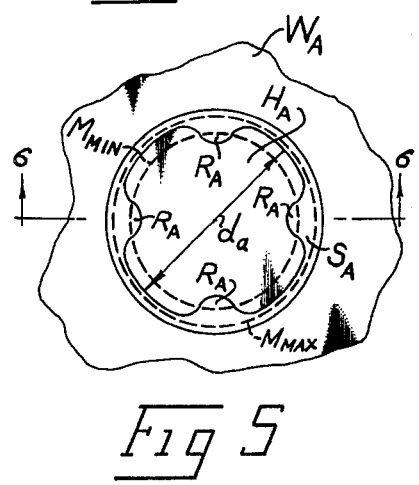

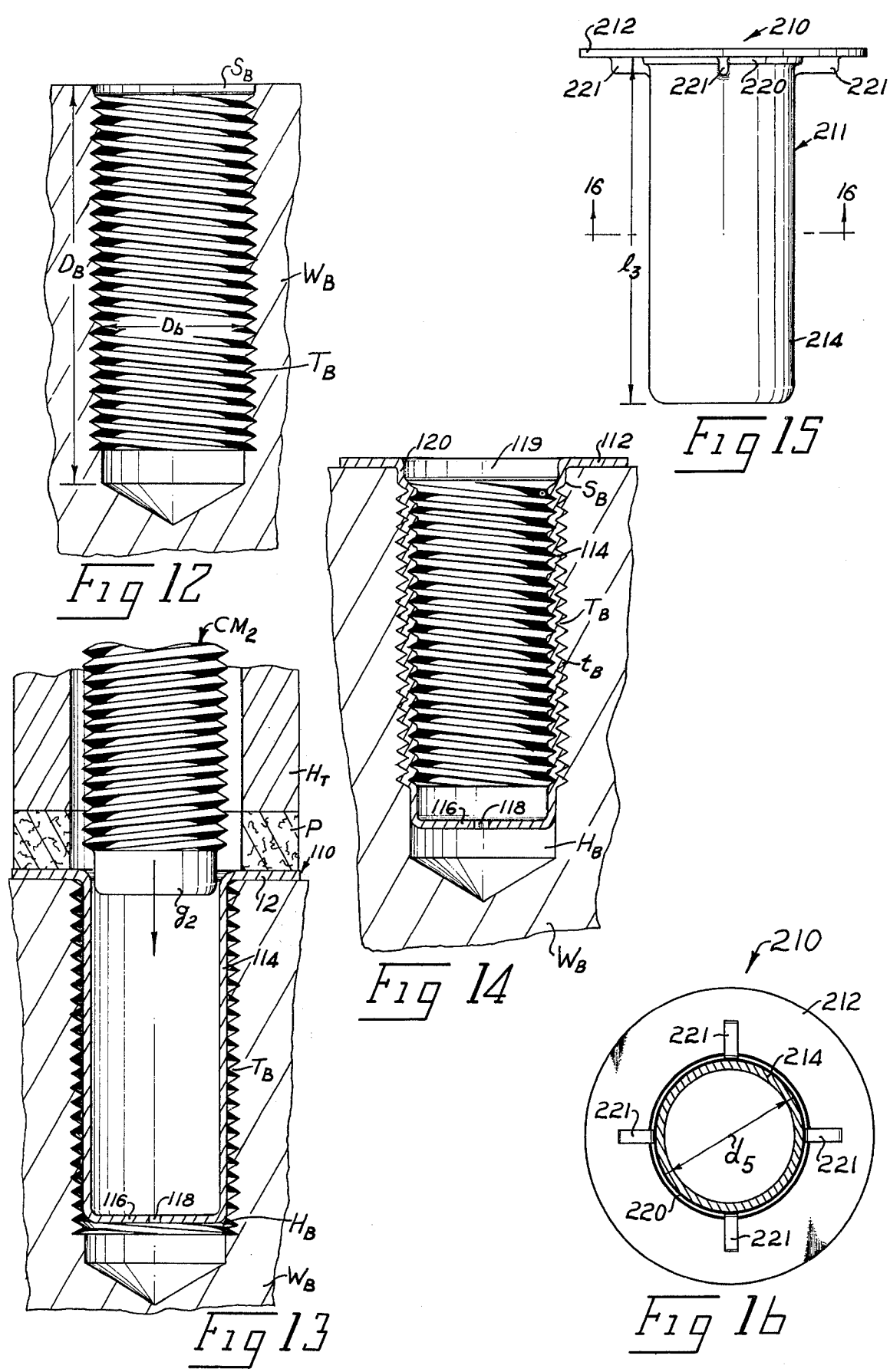

METHOD OF FORMING AN INSERT IN A WORKPIECE FOR RECEIVING A THREADED FASTENER

CROSS-REFERENCE TO RELATED APPLICATIONS

This application is a continuation-in-part of my co-pending application Ser. No. 268,478, filed July 3, 1972 now U.S. Pat. No. 3,835,615, which in turn is a continuation-in-part of my earlier application Ser. No. 33,281, filed Apr. 30, 1970, now abandoned, which is in turn a continuation-in-part of my earlier application Ser. No. 711,368, filed Mar. 7, 1968, now abandoned.

BACKGROUND OF THE INVENTION

Many different kinds of inserts or screw anchors are available on the market today. Some of the problems associated with such prior art inserts are:
1. they are relatively expensive to install;
2. some are difficult to remove while others are difficult to be maintained in the hole during use;
3. they are relatively expensive to manufacture;
4. the variety applications to which an individual insert can be adapted is limited.

SUMMARY OF THE INVENTION

These and other problems associated with the prior art are overcome by the invention disclosed herein by providing an insert in which the threads are actually formed therein after placement in the work piece. This serves to greatly reduce the manufacturing and installation cost of the insert while at the same time increasing the applications to which an individual insert can be put.

The insert includes a tubular member with a seamless side wall and a head flange at one end thereof. The insert is placed in a hole in a work piece and a coining mandrel is forced into the tubular member while the insert is held against rotation to coin the desired internal thread configuration into the side wall without removing any material therefrom. After the coining mandrel is removed, a threaded fastener can be screwed therein.

The side wall has an external configuration to be received in the preformed hole in the work piece and its thickness remains substantially constant throughout the installation operation. Also, holding means may be provided on the head flange to prevent rotation of the insert during installation.

The method of the invention includes placing the uncoined insert in a preformed hole in the work piece. If the work piece is a relatively strong material such as metal, the preformed hole may be internally threaded prior to insertion of the insert. If the work piece can be deformed relatively easy but not significantly compressible as with plastics, then the preformed hole may be non-circular and the insert also non-circular in shape. On the other hand, if the material of the work piece is both easily deformed and also compressible as is the case with wood, then the hole can be plain.

After the uncoined insert is in place, the insert is held against rotation and the coining mandrel driven into the insert to seat it and form the fastener receiving threads on the inside of the insert without removing any material from the insert. Certain of the threads may be deformed to lock the insert in place. The coining mandrel is removed and the fastener screwed into place.

These and other features and advantages of the invention disclosed herein will become more apparent upon consideration of the following specification and accompanying drawings wherein like characters of reference designate corresponding parts throughout the several views and in which:

BRIEF DESCRIPTION OF THE DRAWINGS

FIG. 1 is an exploded perspective view illustrating one embodiment of the invention;

FIG. 2 is a side view of that embodiment of the invention shown in FIG. 1;

FIG. 3 is a transverse cross-sectional view taken alone line 3—3 in FIG. 2;

FIG. 4 is a longitudinal cross-sectional view taken along line 4—4 in FIG. 2;

FIG. 5 is a view showing the preformed hole in a work piece for receiving that embodiment of the invention shown in FIGS. 1-4;

FIG. 12 is a longitudinal cross-sectional view showing the preformed hole in a work piece for receiving the second embodiment of the invention;

FIG. 13 is a view similar to FIG. 12 showing the second embodiment of the invention in position within the preformed hole;

FIG. 14 is a view similar to FIG. 13 showing the second embodiment of the invention installed;

FIG. 15 is a side view of another embodiment of the invention;

FIG. 16 is a transverse cross-sectional view taken along line 16—16 in FIG. 15;

Figure 6:
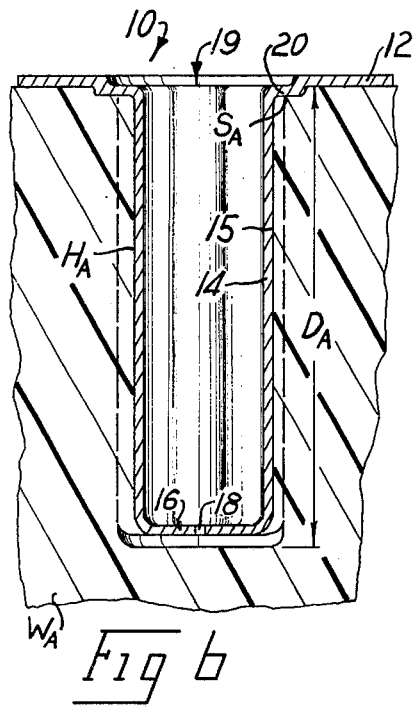
FIG. 6 is a cross-sectional view taken along line 6—6 in FIG. 5 showing the embodiment in FIGS. 1-4 in position in the hole.

These figures and the following detailed description disclose specific embodiments of the invention, however, it is to be understood that the inventive concept is not limited thereto since it may be embodied in other forms.

DETAILED DESCRIPTION OF ILLUSTRATIVE EMBODIMENTS

Referring to the figures, it will be seen that three embodiments of the invention are disclosed, mainly the first embodiment indicated by the numeral 10 shown in FIGS. 1-9, the second embodiment designated by the numeral 110 shown in FIGS. 10-14, and the third embodiment designated by the numeral 210 shown in FIGS. 15-19. The first embodiment 10 is designed for use in work pieces in which the material of the work piece is relatively easily deformed but not readily compressible. The second embodiment is designed for use in work pieces in which the material of the work pieces is neither easily deformed nor readily compressible. The third embodiment 210 is designed for use in work pieces in which the material of the work pieces is not only relatively easily deformable but also readily compressible. Thus, the first embodiment 10 is designed for use in materials such as plastics and soft metals while the second embodiment 110 is designed for use in hard material such as certain aluminum alloys and steel while the third embodiment 210 is designed for use primarily in wood. It will be seen that all of the embodiments of the invention are installed by first making a preformed hole H in the work piece W, thereafter placing the particular embodiment of the insert to be used in the preformed hole H, then forming internal threads in the insert with a coining mandrel without removing any material from the insert itself, and thereafter installing the fastener in the insert.

FIRST EMBODIMENT

Referring now specifically to FIGS. 1–4, it will be seen that the insert 10 includes generally a tubular section 11 which fits into the preformed hole $H_A$ in the work piece $W_A$ as seen in FIGS. 5–9 and an annular head flange 12 integral with one end of the tubular section 11. The tubular section 11 includes a side wall 14 generally circular in cross section with a plurality of inwardly directed flutes 15 extending along the length thereof. The flutes 15 are arcuate in cross-section and the side wall 14 is continuous about its periphery. It will be noted that the major outside diameter of the side wall 14 is $d_1$ as will become more apparent. That end of the tubular portion 14 opposite the head flange 12 may be closed by an end wall 16 integral with the side wall 14. The end wall 16 may be provided with an opening 18 for use in removing the insert after an installation thereof as will become more apparent. It will be noted that the length $l_1$ of the tubular section 11 is equal to or slightly less than the depth $D_A$ of the hole $H_A$ in the work piece as will be more fully explained. The opening 19 through the head flange 12 has a diameter $d_2$ which is equal to or slightly larger than the major diameter of the coining mandrel as will become more apparent so that the head flange 12 does not have to be expanded during the coining of the insert for installation. The head flange 12 is connected to the tubular section 11 through an annular L-shaped section 20 so that the head flange 12 is integral with the tubular section 11.

Figure 8:
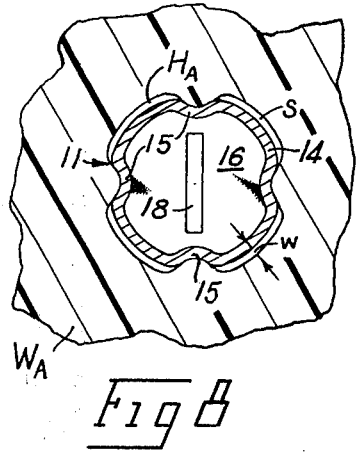
FIG. 8 is a cross-sectional view taken along line 8—8 in FIG. 7.
Figure 10:
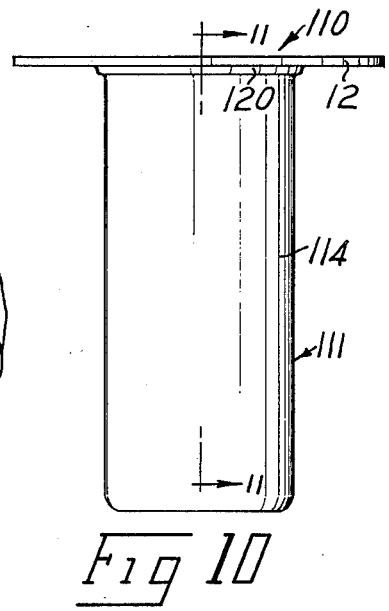
FIG. 10 is a side view of another embodiment of the invention.

Referring now to FIGS. 5–9, it will be seen that the hole $H_A$ is formed in the work piece $W_A$. The material of work piece $W_A$ is such that it is readily deformable but not readily compressible such as a plastic. The hole $H_A$ has the same general cross-sectional shape as the tubular section 11 of the insert 10. If the work piece is plastic, the hole will usually be cast as the part is formed, however, other forming techniques may be used. It will be noted, however, that the hole $H_A$ has a major diameter $d_a$ which is greater than the major diameter $d_1$ of the insert 10 by a prescribed amount. It will be further noted that the ribs $R_A$ formed in the holes $H_A$ has an outside configuration complementary to the outside configuration of the flutes 15 in the tubular section 11 so that when the tubular section 11 is placed in the hole $H_A$, the ribs $R_A$ will engage the side wall 14 within the flutes 15 thereof to prevent the insert 10 from rotating during the installation thereof as best seen in FIG. 8. Because the major diameter $d_a$ of the hole $H_A$ is larger than the major diameter $d_1$ of the insert 10, it will be seen that a space $s$ is left between that portion of the side wall 14 other than within the flutes 15 so that when the insert is coined into a threaded condition, the material of the work piece $W_A$ will be displaced to just fill the space $s$ during the coining operation. This insures contact at all points between the work piece $W_A$ and the insert 10 without any of the material of work piece $W_A$ being extruded out of the mouth of hole $H_A$. In order to determine the width $w$ of the space $s$, it is necessary to calculate the amount of material that will be displaced within the work piece $W_A$ during the installation of insert 10 so that no excess material will be extruded from around the insert 10 that would prevent the head flange 12 from properly resting on the outside edge of the work piece $W_A$. It will be seen that since the width $w$ of the space $s$ would be one-half the thread height after the threads are coined into the insert 10 if the ribs $R_A$ are not considered, the correct width $w$ can be determined by calculating the volume of the space $s$ without the volume of the ribs $R_A$ and then subtracting the volume of the undeformed ribs $R_A$ from that volume. For example, if the volume of the material in the ribs $R_A$ is equal to approximately one-fourth of the volume to be displaced, it will be seen that the width $w$ would be approximately three-fourths of the thread height of the threads to be coined into the insert 10. For purposes of illustration, the major and minor crest diameters in the material of the work piece $W_A$ after the insert is coined have been superimposed over the preformed hole $H_A$ seen in FIG. 5 and respectively designated $m_{max}$ and $m_{min}$. To provide for seating of the head flange 12, an annular recess $S_A$ is provided about the mouth of hole $H_A$ to receive the L-shaped section 20 therein as seen in FIGS. 5 and 6.

Figure 7:
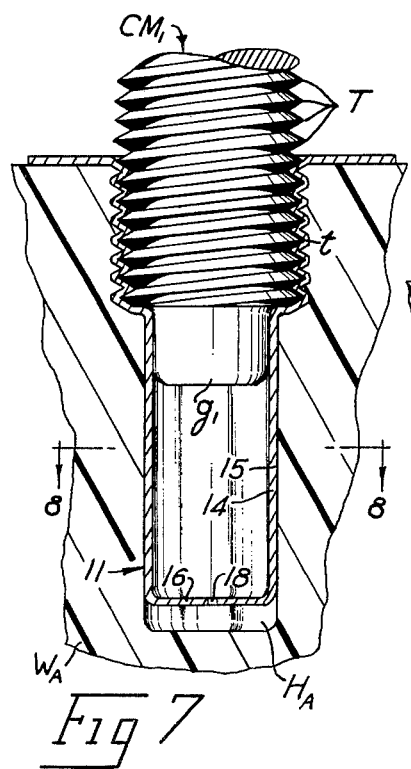
FIG. 7 is a view similar to FIG. 6 showing the threads being coined in the invention.
Figure 9:
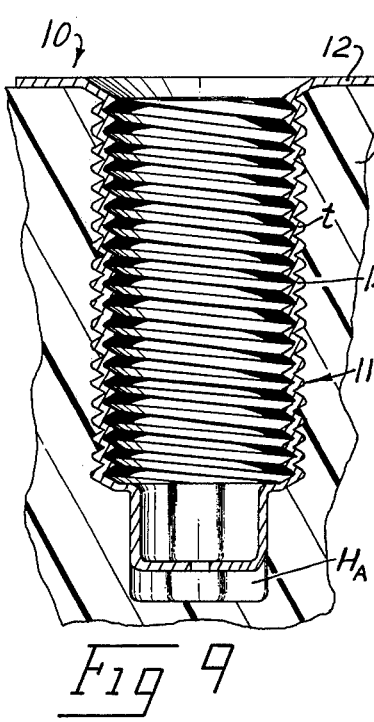
FIG. 9 is a view similar to FIG. 7 showing the invention installed.
Figure 11:
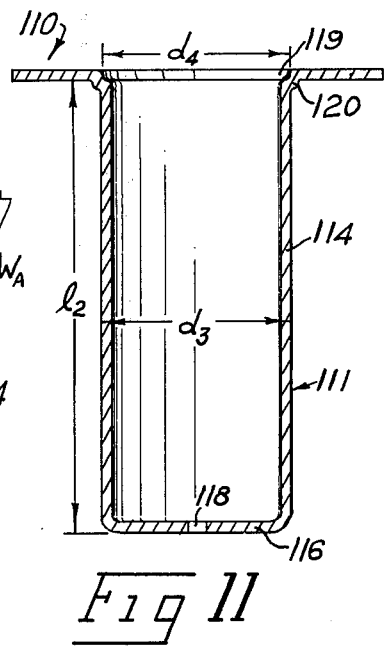
FIG. 11 is a longitudinal cross-sectional view taken along line 11—11 in FIG. 10.

After the insert 10 is placed within the holes $H_A$ and the work piece $W_A$ until the head flange 12 rests on the outside surface of the work piece $W_A$ about the hole $H_A$, a coining mandrel $CM_1$ as seen in FIG. 7 is inserted into the insert 10 and rotated as it is forced into the insert to form the threads $t$ therein as seen in FIG. 9. The coining mandrel $CM_1$ has threads T thereon as is known in the art which deforms the side wall 14 into a threaded configuration to form the threads $t$ yet does not cut the side wall 14 or remove any material therefrom. A guide $g_1$ may be provided on the end of the coining mandrel $CM_1$ which has a diameter substantially equal to the minor diameter of the side wall 14 at the flutes 15 for use in guiding the coining mandrel into the insert 10. It will be noted that the material of the work piece $W_A$ about the hole $H_A$ is deformed so as to fill the original space $s$ between the insert 10 and the hole $H_A$ as well as the voids behind the threads as they are coined into the insert 10. A small portion of the side wall 14 will be left undeformed where the guide $g_1$ fits so that that portion of the undeformed ribs $R_A$ will serve to retain the insert in position so that a threaded fastener of known construction can be placed therein. It will further be noted that the threads T on the coining mandrel $CM_1$ may not fully form the threads $t$ in the insert 10 so that when the fastener is installed, a good interference fit is obtained between the insert 10 and the fastener and the threads $t$ will be fully formed upon installation of the fastener. This will be explained in more detail later. If it is desirable to remove the insert after installation, a member such as a screw driver may be inserted through the slot 18 in the end wall 16 and sufficient forces generated to deform the undeformed portions of the side wall 14 and/or the undeformed ribs $R_A$ so that the insert 10 will be released to be unscrewed from the work piece $W_A$.

SECOND EMBODIMENT

Referring to FIGS. 10–14, the second embodiment of the insert designated by the numeral 110 is illustrated. The insert 110 includes generally a seamless tubular section 111 with an annular head flange 112 integral with one end of section 111. This embodiment of the insert is designed for use in materials which is neither readily deformable nor readily compressible such as metal.

The tubular section 111 is circular in cross-section with a side wall 114 of substantially constant outside diameter $d_3$ along the length $l_2$ thereof. That end of the tubular section 111 opposite the head flange 112 may be closed with an end wall 116 provided with a slot 118 to be used in removing the insert 110 as will be more fully explained. The flange 112 defines a circular opening 119 therethrough similar to the opening 19 in the insert 10 which has a diameter $d_4$ equal to or slightly larger than the coining mandrel that is to be used therewith so that the head flange will not be expanded during the installation operation. An L-shaped annular section 120 connects the head flange 112 with the tubular section 111 so that they are integral with each other.

The work piece $W_B$ in which the insert 110 is to be installed has a hole $H_B$ of depth $D_B$ greater than length $l_2$ formed therein in conventional manner and then tapped to form threads $T_B$ therein which are complementary to the threads that the installed insert 110 is to have but with a diameter greater than the diameter of the fastener to be installed therein by an amount equal to the wall thickness $t_2$ of the side wall 114 as will become more apparent. The outside diameter $d_3$ of the tubular section 111 in an undeformed state is substantially equal to or slightly less than the inside crest diameter $D_b$ of the hole $H_B$. This allows the insert 110 to be dropped into the hole $H_B$ until the head flange 112 rests against the exposed surface of the work piece $W_B$ as seen in FIG. 13. A recess $S_B$ is provided about the mouth of hole $H_B$ to receive the L-shaped section 120 so that the head flange 112 will rest on the surface of work piece $W_B$.

Next, a coining mandrel $CM_2$ which has external threads T thereon that corresponding to the external thread configuration of the fastener to be installed in the insert after installation is aligned with the insert 110 as shown in FIG. 13 so that when the coining mandrel $CM_2$ is rotated and forced down into the hole $H_B$ inside the insert 110, the insert 110 will be coined into the threads $T_B$ in the hole $H_B$ so that the thread shape on the coining mandrel $CM_2$ is reproduced in the side wall 114 of the insert 110. It will also be noted that a guide $g_2$ may be provided on the end of the coining mandrel $CM_2$ which has a diameter equal to the inside diameter of the tubular section 111 to guide the coining mandrel $CM_2$ into the insert 110. To prevent the insert 110 from rotating while the threads $t_B$ are being coined therein by the mandrel $CM_2$, annular holding tool HT located concentrically about the coining mandrel $CM_2$ and movable longitudinally relatively thereto but not rotating therewith engages the exposed surface of the head flange 112 through a friction engagement pad P. If it is desirable to remove the installed insert 110, it will be seen that a tool such as a screw driver can be inserted into the slot 118 in the end wall 116 to unscrew same. It is also to be understood that the mandrel $CM_2$ may partially form threads $t_b$ with the fastener finally forming them as it is installed.

THIRD EMBODIMENT

Referring to FIGS. 15–18, the third embodiment of the invention designated 210 is illustrated. Insert 210 is designed primarily for use in material that is both readily deformable and readily compressible such as wood. The insert 210 includes generally a seamless tubular section 211 with an annular head flange 212 integral with one end of section 211.

The tubular section 211 is circular in cross-section with a side wall 214 of substantially constant outside diameter $d_5$ along the length $l_3$ thereof. That end of tubular section 211 opposite the head flange 212 may be closed with an end wall 216 provided with a slot 218 to be used in removing the insert 210 as will become apparent. The flange 212 defines a circular opening 219 therethrough similar to the opening 119 in insert 110 which has a diameter $d_6$ equal to or slightly larger than the coining mandrel to be used therewith in order not to expand the head flange 212 during installation. An L-shaped annular section 220 connects the head flange 212 with the tubular section 211 so that they are integral with each other. A plurality of locking bars 221 are provided on the underside of head flange 212 to serve as an antirotational means to prevent the insert 210 from turning during installation. The bars 221 extend from adjacent the tubular section 211 to adjacent the outside edge of head flange 212. They may be formed on the flange 212 as additional material as seen on the left side in FIG. 17 or formed by dimpling the flange 212 as seen on the right side in FIG. 17.

Figure 17:
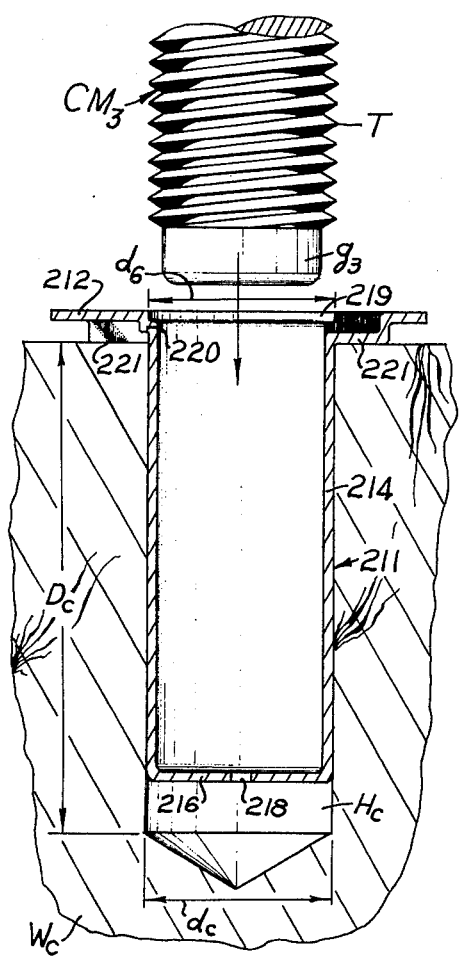
FIG. 17 is a longitudinal cross-sectional view showing the preformed hole in a work piece with the third embodiment of the invention in position for installation.

The work piece $W_C$ in which insert 210 is installed has a hole $H_C$ of depth $D_C$ greater than length $l_3$ formed therein in conventional manner such as by drilling. The diameter $d_C$ of hole $H_C$ is substantially equal to the undeformed outside diameter $d_5$ of the tubular section 211 so that the section 211 will be just slidably received therein. This allows insert 210 to be droped into hole $H_C$ until the bars 221 rest on the outside surface of work piece $W_C$ as seen in FIG. 17.

Figure 19:
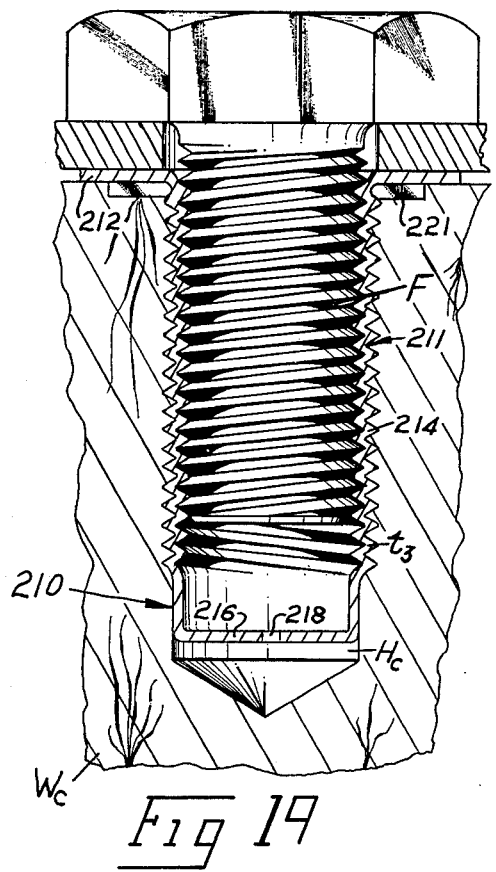
FIG. 19 is a view similar to FIG. 18 showing a fastener installed.
Figure 18:
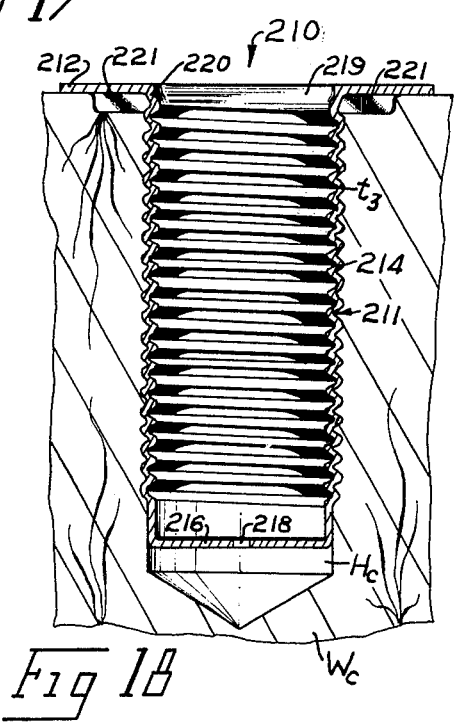
FIG. 18 is a view similar to FIG. 17 showing the third embodiment of the invention installed.

A coining mandrel $CM_3$ which has external threads T thereon that correspond to the external thread configuration of the fastener to be installed in the insert after installation is used for the installation of insert 210 similarly to that described for the other inserts. A guide $g_3$ is provided on the leading end of mandrel $CM_3$ to maintain alignment with insert 210. With the guide $g_3$ positioned in the open end of tubular section 211, the workman first forces the mandrel $CM_3$ toward work piece $W_C$ to force the locking bars 221 and L-shaped section 220 into the material of the work piece $W_C$ until head flange 212 rests on the outside surface of the work piece about the hole $H_C$. The workman then causes the mandrel $CM_3$ to rotate to drive the mandrel into the tubular section 211 to reproduce the thread shape of mandrel $CM_3$ in side wall 214 and from threads $t_3$. This forces the side wall 214 out into the material of work piece $W_C$ to compress and deform same into the configuration of the outside of threads $t_3$. The natural resiliency of the material of work piece $W_C$ holds the insert 210 in position as seen in FIG. 18 by engagement with threads $t_3$ and locking bars 221. If it is desirable to remove the insert 210, a screw driver may be inserted in slot 218 and drive the insert out of the work pieces. Finally, the fastener F is installed as seen in FIG. 19 to complete the unit.

Figure 20:
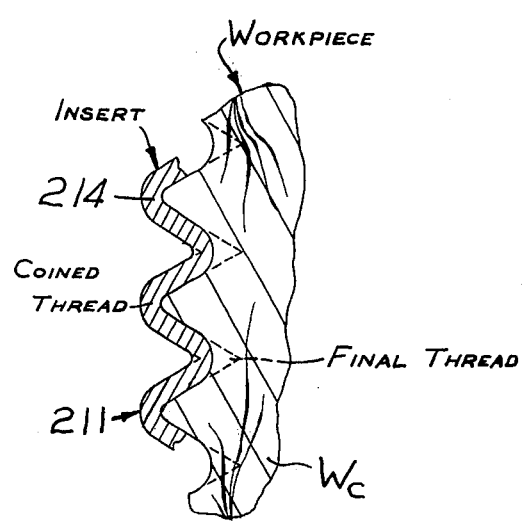
FIG. 20 is an enlarged partial cross-sectional view illustrating the formation of the threads in the invention.

In all instances, the coining mandrels may be used to partially form the threads in the side wall of the insert as seen by solid lines in FIG. 20 and the fastener used to finally form the threads as shown by dashed lines in FIG. 20. Because the insert is made of a relatively hard metal such as stainless steel and because the side wall of the tubular section is thin in the order of 0.0008–0.0016 inch, virtually no thinning of the side wall takes place as the insert is installed.

It is to be understood that full use of modifications, substitutions, and equivalents may be made without departing from the scope of the invention as disclosed herein.

I claim:

1. A method of forming an insert in a work piece for receiving a threaded fastener therein comprising the steps of:
    a. forming a hole in the work piece with internally projecting, circumferentially spaced, longitudinally extending ribs on the work piece within the hole said hole having a first prescribed diameter;
    b. placing a tubular member having an annular seamless tubular side wall having a generally circular crosssection with a maximum outside diameter a prescribed amount smaller than said first diameter and a head flange integral with one end of said side wall within said hole until said head flange engages said work piece, said side wall further defining a plurality of circumferentially spaced, longitudinally extending flutes therein, said flutes adapted to be slidably received on said ribs and engaged thereby to prevent rotation of said tubular member during step (c); and,
    c. forcing a coining mandrel having external threads thereon corresponding to the threads on said fastener along the inside of said side wall while rotating said coining mandrel to form external and internal threads in said side wall and force said external threads into intimate engagement with said work piece about said hole while forcing the side wall into the work piece about the preformed hole so as to deform the work piece about the hole into the external shape of the coined threads in the side wall.

2. The method of claim 1 wherein the first diameter is such that when the material within the ribs is displaced in step (c) the material of the work piece about the holes completely fills the outside of the threads coined in the side wall of the tubular member.

* * * * *